US012627195B2

(12) United States Patent
Ishibashi

(10) Patent No.: US 12,627,195 B2
(45) Date of Patent: May 12, 2026

(54) DRIVE APPARATUS

(71) Applicant: TOYOTA JIDOSHA KABUSHIKI KAISHA, Toyota (JP)

(72) Inventor: Masayuki Ishibashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/909,054

(22) Filed: Oct. 8, 2024

(65) Prior Publication Data

US 2025/0132631 A1 Apr. 24, 2025

(30) Foreign Application Priority Data

Oct. 20, 2023 (JP) ................................. 2023-180984

(51) Int. Cl.
| | |
|---|---|
| *H02K 5/20* | (2006.01) |
| *F16H 57/04* | (2010.01) |
| *B60K 1/00* | (2006.01) |
| *F16H 57/02* | (2012.01) |
| *H02K 7/116* | (2006.01) |
| *H02K 9/19* | (2006.01) |

(52) U.S. Cl.
CPC .......... *H02K 5/20* (2013.01); *F16H 57/0476* (2013.01); *B60K 2001/003* (2013.01); *F16H 2057/02034* (2013.01); *F16H 57/0415* (2013.01); *F16H 57/0436* (2013.01); *H02K 7/116* (2013.01); *H02K 9/19* (2013.01)

(58) Field of Classification Search
CPC ............... F16H 57/0476; F16H 57/037; F16H 57/0415; F16H 57/0436; F16H 57/04853; F16H 2057/02026; F16H 2057/02034; F16H 2057/02052; B60K 2001/003; H02K 5/20; H02K 9/19; H02K 7/116
USPC ....... 475/150, 159, 160; 184/6.12, 26, 104.1
See application file for complete search history.

(56) References Cited

U.S. PATENT DOCUMENTS

| | | | | |
|---|---|---|---|---|
| 12,385,563 | B2 * | 8/2025 | Ishibashi ................. | B60K 1/00 |
| 2020/0136471 | A1 | 4/2020 | Fukunaga et al. | |
| 2020/0266687 | A1 * | 8/2020 | Nakamatsu ............. | B60K 1/00 |
| 2020/0300353 | A1 | 9/2020 | Ishikawa et al. | |
| 2022/0376588 | A1 * | 11/2022 | Nakamura .......... | F16H 57/0417 |
| 2023/0069613 | A1 * | 3/2023 | Osuga ................... | H02K 7/083 |
| 2024/0278636 | A1 | 8/2024 | Yokoyama | |

(Continued)

FOREIGN PATENT DOCUMENTS

| | | | |
|---|---|---|---|
| DE | 102020104186 | A1 | 9/2020 |
| DE | 112020006745 | T5 | 12/2022 |
| DE | 102022208717 | A1 | 3/2023 |

(Continued)

*Primary Examiner* — Roger L Pang
(74) *Attorney, Agent, or Firm* — OLIFF PLC

(57) ABSTRACT

A drive apparatus includes: a casing; a motor; a gear unit; an electric unit; a first route; a second route; and a heat exchanger. The casing includes: a motor chamber; a gear chamber; and an electric unit chamber. The electric unit chamber has at least a part positioned to be closer to one axial-direction side than the gear chamber. The motor shaft has one end on the one axial-direction side positioned in the gear chamber. The heat exchanger has at least a part that overlaps with the gear chamber in the axial direction and that overlaps with the electric unit chamber in a radial direction perpendicular to the axial direction.

11 Claims, 5 Drawing Sheets

(56)               References Cited

U.S. PATENT DOCUMENTS

2024/0328502 A1 * 10/2024 Satoda ................ F16H 57/0471

FOREIGN PATENT DOCUMENTS

| | | | |
|---|---|---|---|
| JP | 2020-068637 A | 4/2020 | |
| WO | 2022/270211 A1 | 12/2022 | |
| WO | WO-2023057148 A1 * | 4/2023 | ......... F16H 57/0495 |

* cited by examiner

DRIVE APPARATUS

CROSS-REFERENCE TO RELATED APPLICATION

This application claims priority to Japanese Patent Application No. 2023-180984 filed on Oct. 20, 2023, incorporated herein by reference in its entirety.

BACKGROUND

1. Technical Field

The present disclosure relates to a drive apparatus.

2. Description of Related Art

An integrated drive apparatus including a motor chamber, a gear chamber, and an electric unit chamber has been known. A technology of mounting an oil cooler on the integrated drive apparatus has also been known. Japanese Unexamined Patent Application Publication No. 2020-68637 discloses a related technology.

SUMMARY

In integrated drive apparatuses, the physical size of the drive apparatus is desired to be downsized. However, depending on an aspect of mounting an oil cooler on the drive apparatus, there is a concern that the physical size of the drive apparatus may increase due to the oil cooler.

A drive apparatus according to a first aspect of the present disclosure includes: a casing; a motor; a gear unit; an electric unit; a first route; a second route; and a heat exchanger. The casing includes: a motor chamber; a gear chamber; and an electric unit chamber. The electric unit chamber has at least a part positioned to be closer to one axial-direction side than the gear chamber. The motor is housed in the motor chamber and includes a motor shaft. The motor shaft has one end on the one axial-direction side positioned in the gear chamber. The gear unit is housed in the gear chamber and configured to be mechanically connected to the one end of the motor shaft. The electric unit is housed in the electric unit chamber and configured to be electrically connected to the motor. The first route is configured to supply a first heat medium configured to cool the motor to the motor. The second route is configured to supply a second heat medium configured to cool the electric unit to the electric unit. The heat exchanger is included on the first route and on the second route. The heat exchanger is configured to exchange heat between the first heat medium and the second heat medium. The heat exchanger has at least a part that overlaps with the gear chamber in the axial direction and that overlaps with the electric unit chamber in a radial direction perpendicular to the axial direction.

In the configuration described above, at least a part of the heat exchanger overlaps with the gear chamber in the axial direction of the motor shaft. As a result, the increase in the width of the drive apparatus in the axial direction due to the heat exchanger can be reduced. In the configuration described above, at least a part of the heat exchanger overlaps with the electric unit chamber in the radial direction perpendicular to the axial direction. As a result, the increase in the width of the drive apparatus in the radial direction due to the heat exchanger can be reduced. It becomes possible to downsize the physical size of the drive apparatus.

In the drive apparatus according to the first aspect of the present disclosure, at least a part of the electric unit chamber may be positioned to be positioned on the one axial-direction side relative to the heat exchanger.

According to the configuration described above, the increase in the width of the drive apparatus in the axial direction due to the heat exchanger can be reduced.

In the drive apparatus according to the first aspect of the present disclosure, at least the part of the electric unit chamber may overlap with the gear chamber in the radial direction.

According to the configuration described above, the protruding amount of the electric unit chamber to the one axial-direction side can be reduced. It becomes possible to downsize the physical size of the drive apparatus.

In the drive apparatus according to the first aspect of the present disclosure, at least the part of the electric unit chamber may overlap with the motor chamber in the axial direction.

According to the configuration described above, the protruding amount of the electric unit chamber in the radial direction perpendicular to the axial direction can be reduced. It becomes possible to downsize the physical size of the drive apparatus.

In the drive apparatus according to the first aspect of the present disclosure, at least a part of the heat exchanger and at least a part of the first route may be positioned on the one axial-direction side with respect to the gear chamber.

In the drive apparatus according to the first aspect of the present disclosure, at least the part of the first route may be configured by a pipe member.

In the drive apparatus according to the first aspect of the present disclosure, the first route may extend into the electric unit chamber from the outside of the casing by passing through a wall surface that defines the electric unit chamber of the casing.

According to the configuration described above, the first route that reaches one end of the motor shaft via the wall surface of the gear chamber and the inside of the electric unit chamber can be configured.

In the drive apparatus according to the first aspect of the present disclosure, a part of the electric unit chamber may be positioned on an extension line of the motor shaft toward the one axial-direction side. The one end of the motor shaft may be supported by a separating wall between the gear chamber and the electric unit chamber. A flow passage may be provided in an axial center of the motor shaft. The first route may be configured to extend through the inside of the electric unit chamber and pass through the separating wall. The first route may be configured to be connected to the flow passage at the one end.

According to the configuration described above, the heat medium can be supplied from the one end of the motor shaft.

In the drive apparatus according to the first aspect of the present disclosure, the drive apparatus may further include a pump configured to send out the first heat medium accumulated in the gear chamber to the first route. The pump may be positioned on the one axial-direction side or the other axial-direction side with respect to the gear chamber. Within the first route, the heat exchanger may be disposed in a section that connects the pump and the one end of the motor shaft to each other.

In the drive apparatus according to the first aspect of the present disclosure, the motor chamber and the gear chamber may be connected to each other by a communication hole configured such that the first heat medium flows through the communication hole. The electric unit chamber may be isolated from the motor chamber and the gear chamber in a liquid-tight manner.

In the drive apparatus according to the first aspect of the present disclosure, the casing may include: a motor case including the motor chamber; a gear case configured to define at least a part of the gear chamber; and an electric unit case configured to define at least a part of the electric unit chamber. The gear case and the electric unit case may be fastened to the motor case by a plurality of fastening members.

According to the configuration described above, the gear case and the electric unit case can be assembled independently of each other. The ease of constructing the drive apparatus can be enhanced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Example 1

Configuration of Drive Apparatus 1

Figure 1:
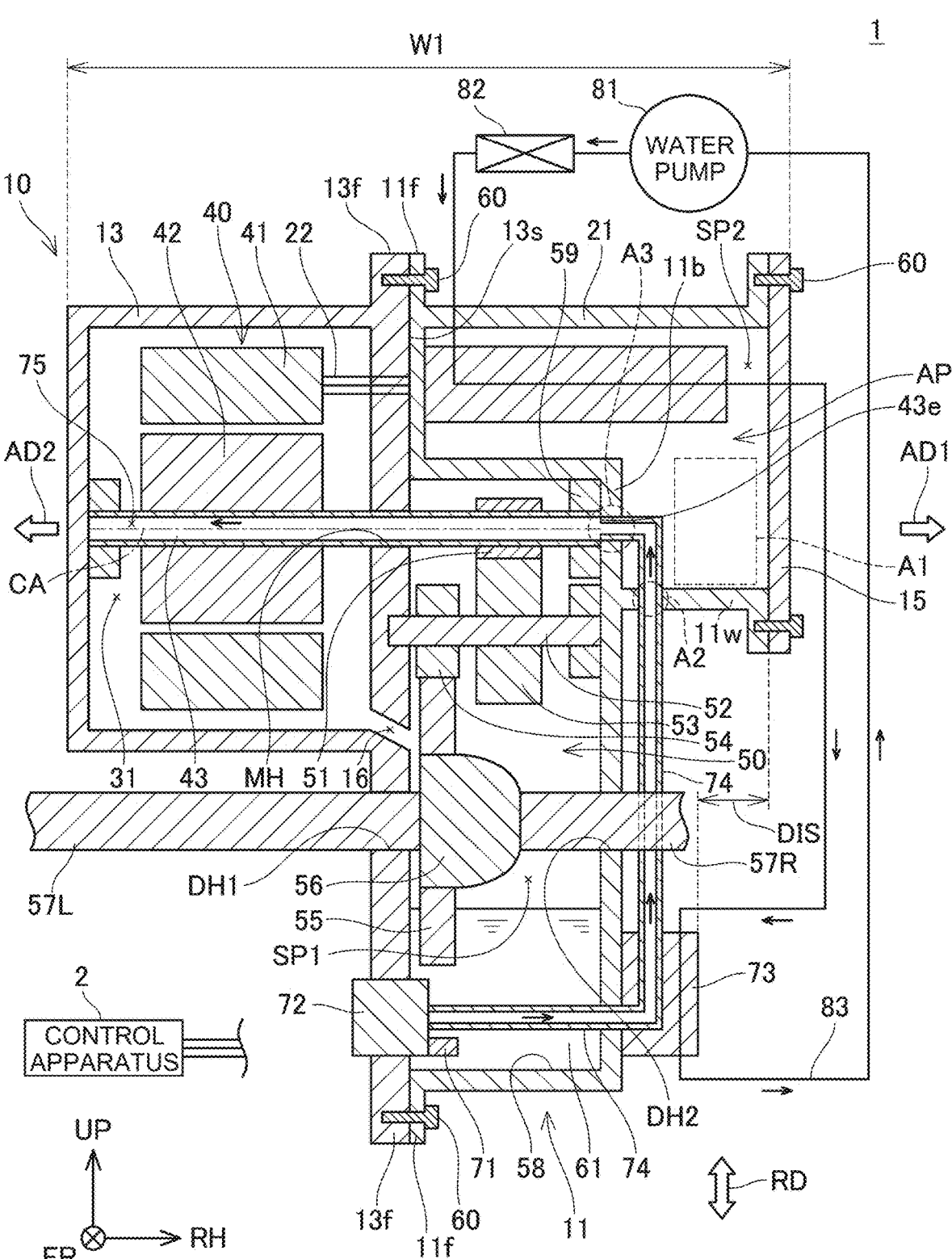
FIG. 1 is a sectional view showing a schematic configuration of a drive apparatus.

FIG. 1 is a sectional view showing a schematic configuration of a drive apparatus 1 of an example of the present disclosure. The drive apparatus 1 is an integrated apparatus in which a motor, a gear unit, and an electric power conversion unit for controlling the motor are stored in a same casing. Directions FR, RH, UP indicate orientations of the drive apparatus 1 with respect to a vehicle when the drive apparatus 1 is mounted on a vehicle (battery electric vehicle). The direction FR indicates the front side in the front-rear direction of the vehicle. The direction RH indicates the right side in the left-right direction (or the width direction) of the vehicle. The direction UP indicates the upper side in the up-down direction of the vehicle. The same applies to other drawings. In FIG. 1, a plurality of axes (a motor shaft 43, a countershaft 52, and drive shafts 57L and 57R) are shown in a developed manner so as to be positioned on the same plane.

The drive apparatus 1 is controlled by a control apparatus 2. The control apparatus 2 includes a CPU, a RAM, a ROM, an input-output interface, and the like. The control apparatus 2 is connected to the electric power conversion unit 21 and the like by a signal line (not shown).

The drive apparatus 1 includes a casing 10. The casing 10 includes a first case 11, a motor case 13, and a lid portion 15. The first case 11 and the motor case 13 may be castings.

The first case 11 includes a first flange 11f that extends along an outer peripheral edge of the first case 11. The motor case 13 includes a motor case flange 13f that extends along an outer peripheral edge of the motor case 13. The first case

4

11 is fastened to the motor case 13 by a plurality of bolts 60. The first case 11 includes an opening portion AP. The lid portion 15 is fastened to the first case 11 by the plurality of bolts 60 so as to close the 15 opening portion AP.

The motor case 13 includes a motor chamber 31. A motor 40 is stored in the motor chamber 31. In other words, the motor case 13 houses the motor 40. The motor 40 includes a stator 41, a rotor 42, and the motor shaft 43. The stator 41 has a cylindrical shape. The rotor 42 is rotatably disposed in the stator 41. The motor shaft 43 includes a central axis CA.

The motor case 13 includes a facing surface 13s that faces the first case 11. A motor shaft hole MH and a drive shaft hole DH1 are formed in the facing surface 13s. The motor shaft 43 passes through the motor shaft hole MH. A left-side drive shaft 57L passes through the drive shaft hole DH1.

The first case 11 includes a box-like shape of which one surface is open. The first case 11 is fastened to the facing surface 13s such that an opening surface is closed by the facing surface 13s. As a result, a gear chamber SP1 is defined between the motor case 13 and the first case 11. A gear unit 50 is stored in the gear chamber SP1. In other words, the first case 11 houses the gear unit 50.

The gear unit 50 includes a shaft gear 51, the countershaft 52, a first counter gear 53, a second counter gear 54, a ring gear 55, and a differential gear 56. The shaft gear 51 is attached to the motor shaft 43. As a result, the gear unit 50 and the motor 40 are mechanically connected to each other. The first counter gear 53 and the second counter gear 54 are attached to the countershaft 52. The first counter gear 53 is engaged with the shaft gear 51. The second counter gear 54 is engaged with the ring gear 55. The ring gear 55 is attached to the differential gear 56. The pair of drive shafts 57L and 57R extend from the differential gear 56 in the vehicle width direction. The drive shaft 57R passes through a drive shaft hole DH2 formed in the first case 11. An accumulation portion 58 is included below the gear chamber SP1. Oil 61 is accumulated in the accumulation portion 58. A part of the gear unit 50 is immersed in the oil 61 accumulated in the accumulation portion 58.

Figure 2:
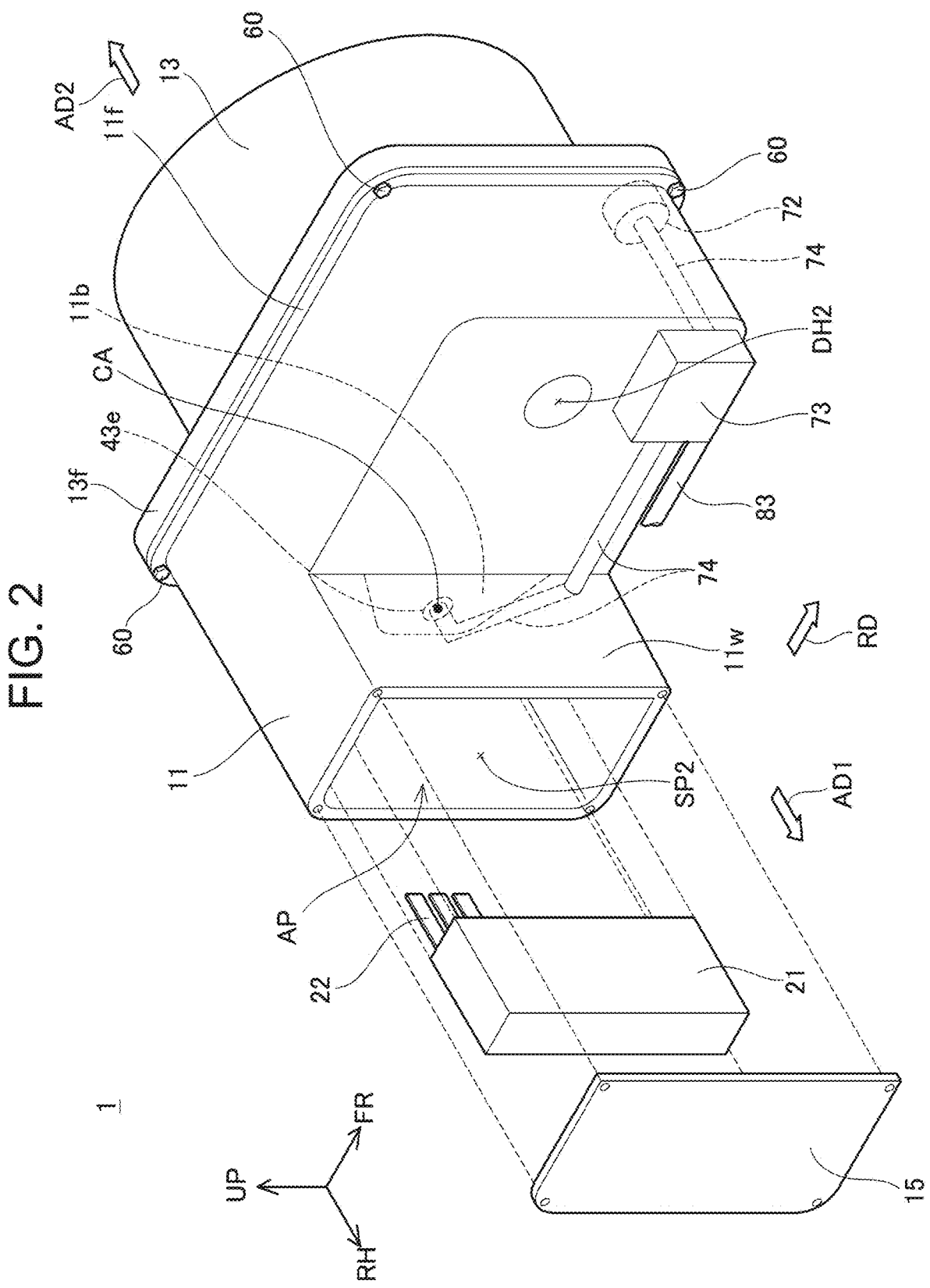
FIG. 2 is a perspective view of the drive apparatus.

FIG. 2 shows a perspective view of the drive apparatus 1. In FIG. 2, a state in which the lid portion 15 and the electric power conversion unit 21 are removed is shown. The position of one end 43e of the motor shaft 43 is indicated by dotted lines. As shown in FIG. 1 and FIG. 2, an electric unit chamber SP2 including the opening portion AP is included in the first case 11. The opening portion AP can be closed by fastening the lid portion 15 by the bolts 60. In other words, the electric unit chamber SP2 is isolated from the motor chamber 31 and the gear chamber SP1 in a liquid-tight manner. The electric power conversion unit 21 is stored in the electric unit chamber SP2. The electric power conversion unit 21 is a section for controlling generated electric power and electric power to be supplied to the motor 40. One example of parts included in the electric power conversion unit 21 includes an inverter, converter, and the like.

The side on which the shaft gear 51 is disposed in the axial direction of the central axis CA of the motor shaft 43 is defined as one axial-direction side AD1. The opposite side is defined as the other axial-direction side AD2. A direction perpendicular to the central axis CA is defined as a radial direction RD.

Configuration of Oil Cooling System and Water Cooling System

The drive apparatus 1 includes an oil cooling system and a water cooling system. First, the oil cooling system is described. The oil cooling system includes a strainer 71, an oil pump 72, an oil cooler 73, an oil passage 74, and an axial-center flow passage 75. In other words, in the present embodiment, oil is one example of a first heat medium, and water is one example of a second heat medium.

The axial-center flow passage 75 is a flow passage formed on an axial line of the motor shaft 43 having a hollow shape (cylindrical shape). The motor shaft 43 includes the one end 43e on the one axial-direction side AD1. The one end 43e is positioned in the gear chamber SP1. An inflow port to the axial-center flow passage 75 is formed in the one end 43c. The one end 43e is supported by a bearing 59. The bearing 59 is fixed to a separating wall 11b between the gear chamber SP1 and the electric unit chamber SP2.

The oil passage 74 is a route that supplies oil to the motor 40. The oil passage 74 may be various structures. For example, the oil passage 74 may be a pipe member or a tunnel formed in a wall surface. In the present example, at least a part of the oil passage 74 is configured by a pipe member.

The oil passage 74 connects a discharge port of the oil pump 72 and an inflow port of the oil cooler 73 to each other and connects a discharge port of the oil cooler 73 and the one end 43e of the motor shaft 43 to each other. In other words, within the oil passage 74, the oil cooler 73 is disposed in a section that connects the oil pump 72 and the one end 43e of the motor shaft 43 to each other. The oil accumulated in the gear chamber SP1 can be supplied to the axial-center flow passage 75 of the motor shaft 43 by the oil passage 74.

The strainer 71 is disposed in the accumulation portion 58. The strainer 71 is connected to the suction port of the oil pump 72. The oil pump 72 is positioned on the other axial-direction side AD2 with respect to the gear chamber SP1. The oil pump 72 sucks the oil 61 in the accumulation portion 58 via the strainer 71. Then, the oil pump 72 sends out the sucked oil to the oil cooler 73 via the oil passage 74.

The oil cooler 73 is one example of a heat exchanger that cools the oil by exchanging heat with the coolant. The oil cooler 73 is positioned on the one axial-direction side AD1 with respect to the gear chamber SP1. In other words, the oil cooler 73 and the oil pump 72 face each other via the gear chamber SP1. The oil cooler 73 overlaps with the gear chamber SP1 in the axial direction of the central axis CA. The oil cooler 73 overlaps with the electric unit chamber SP2 in the radial direction RD. The oil passage 74 and a water passage 83 are disposed to face each other in the oil cooler 73. In other words, the oil cooler 73 is included on the oil passage 74 and the water passage 83. In the present embodiment, the oil passage 74 is one example of a first route. The water passage 83 is one example of a second route.

The discharge port of the oil cooler 73 and the one end 43e of the motor shaft 43 are connected to each other by the oil passage 74. The oil passage 74 that connects the oil cooler 73 and the one end 43e to each other is positioned on the one axial-direction side AD1 with respect to the gear chamber SP1. Specifically, a part of the electric unit chamber SP2 is positioned on an extension line of the motor shaft 43 toward the one axial-direction side AD1 (see a region A1). The oil passage 74 extends into the electric unit chamber SP2 from the outside of the casing 10 through a wall surface 11w that defines the electric unit chamber SP2 (see a region A2). The oil passage 74 extends through the electric unit chamber SP2 and passes through the separating wall 11b (see a region A3). An end portion of the oil passage 74 is connected to the axial-center flow passage 75 on the one end 43c of the motor shaft 43.

In the axial-center flow passage 75, a plurality of discharge holes (not shown) that passes therethrough in the radial direction are provided. The oil flows through the axial-center flow passage 75 to the other axial-direction side AD2. The oil is caused to flow out from the discharge holes and the end portion of the axial-center flow passage 75 on the other axial-direction side AD2 to be supplied to the rotor 42, the stator 41, and the like. The oil supplied to the motor 40 by the axial-center flow passage 75 flows down to the lower side in the motor chamber 31. The oil that has flowed down returns to the accumulation portion 58 in the gear chamber SP1 via a communication hole 16 provided in a partition wall between the motor chamber 31 and the gear chamber SP1.

Next, the water cooling system is described. The water cooling system includes a water pump 81, a radiator 82, and a water passage 83. The water passage 83 is a route that supplies the coolant to the electric power conversion unit 21. The water passage 83 is a route that circulates to the water pump 81 from the water pump 81 via the radiator 82, the electric power conversion unit 21, and the oil cooler 73. By the coolant that circulates through the water passage 83, the electric power conversion unit 21 can be cooled, and the oil can be cooled in the oil cooler 73.

Effects

In the drive apparatus 1 of the present example, the oil cooler 73 overlaps with the gear chamber SP1 in the axial direction of the central axis CA. As a result, the oil cooler 73 can be placed within a range of the gear chamber SP1 when seen from the axial direction of the central axis CA. Therefore, a case in which at least a part of the oil cooler 73 protrudes from the casing 10 in the radial direction RD does not occur. As a result, the increase in the width of the drive apparatus 1 in the radial direction RD due to the oil cooler 73 can be reduced. It becomes possible to downsize the physical size of the drive apparatus 1.

In the drive apparatus 1 of the present example, the oil cooler 73 overlaps with the electric unit chamber SP2 in the radial direction RD. A part of the electric unit chamber SP2 is positioned to be closer to the one axial-direction side AD1 than the oil cooler 73 by a distance DIS. As a result, the oil cooler 73 can be placed within a range of the electric unit chamber SP2 when seen from the radial direction RD. In other words, the oil cooler 73 can be housed within a range in which the electric unit chamber SP2 protrudes. Therefore, a case in which at least a part of the oil cooler 73 protrudes to the one axial-direction side AD1 from the casing 10 does not occur. As a result, the increase in the width of the drive apparatus 1 in the axial direction of the central axis CA due to the oil cooler 73 can be reduced. It becomes possible to downsize the physical size of the drive apparatus 1.

The piping resistance of the oil passage 74 becomes greater as the distance from the discharge port of the oil cooler 73 to the inflow port (one end 43c) of the axial-center flow passage 75 becomes longer. Thus, in the technology of the present example, both of the oil cooler 73 and the one end 43e are disposed on the one axial-direction side AD1 with respect to the gear chamber SP1. As a result, the distance from the discharge port of the oil cooler 73 to the one end 43e can be shortened as compared to a case in which the oil cooler 73 is disposed on the other axial-direction side AD2 with respect to the gear chamber SP1. The piping resistance of the oil passage 74 can be reduced. Therefore, it becomes possible to increase the oil flow rate while maintaining the capacity of the oil pump 72 and downsize the oil pump 72 while maintaining the oil flow rate.

As shown in FIG. 1, a space is formed by a dimension difference between the motor 40 and the gear unit 50 in a region on the side opposite from the gear unit 50 with respect to the motor shaft 43. A part of the electric unit chamber SP2 is disposed in the space. In other words, at least a part of the electric unit chamber SP2 overlaps with the gear chamber SP1 in the radial direction RD perpendicular to the central axis CA. As a result, the space around the motor shaft 43 can be effectively used. Therefore, the protruding amount of the electric unit chamber SP2 on the one axial-direction side AD1 can be reduced. It becomes possible to downsize the physical size of the drive apparatus 1.

At least a part of the electric unit chamber SP2 overlaps with the motor chamber 31 in the axial direction of the central axis CA. The space around the motor shaft 43 can also be effectively used by the above. Therefore, the protruding amount of the electric unit chamber SP2 in the radial direction RD can be reduced.

Example 2

Example 2 is different from Example 1 regarding a disposing aspect of the oil pump 72. Sections in common between Example 1 and Example 2 are denoted by the same reference characters and description thereof is omitted.

Figure 3:
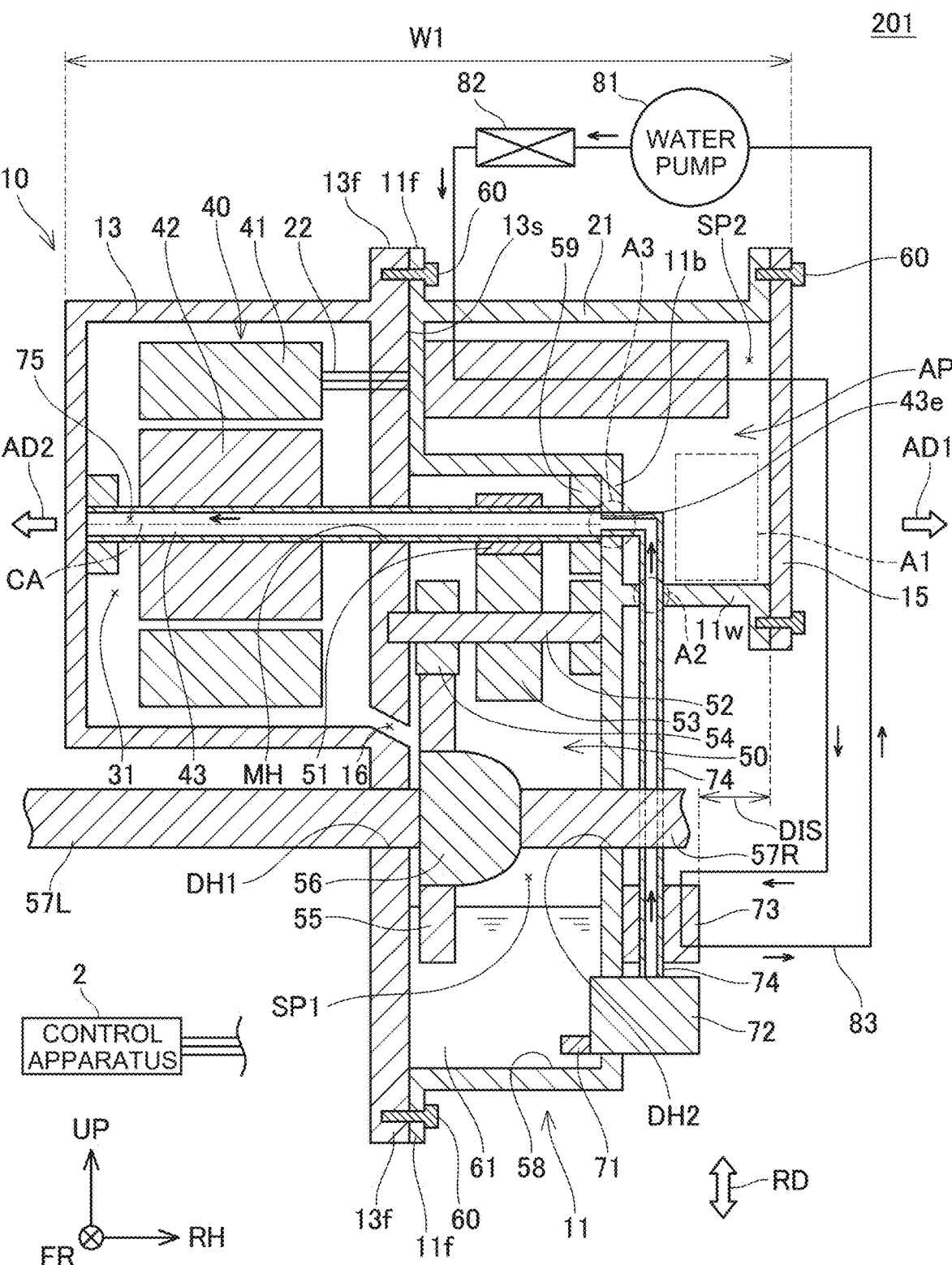
FIG. 3 is a sectional view showing a schematic configuration of the drive apparatus.

FIG. 3 shows a schematic configuration of a drive apparatus 201 of Example 2. FIG. 3 is a sectional view similar to FIG. 1. The oil pump 72 is positioned on the one axial-direction side AD1 with respect to the gear chamber SP1. In other words, both of the oil pump 72 and the oil cooler 73 are disposed on the same direction side with respect to the gear chamber SP1. The oil pump 72 and the oil cooler 73 overlap with the gear chamber SP1 in the axial direction of the central axis CA. The oil pump 72 and the oil cooler 73 overlap with the electric unit chamber SP2 in the radial direction RD. The oil passage 74 connects the discharge port of the oil pump 72 and the inflow port of the oil cooler 73 to each other and connects the discharge port of the oil cooler 73 and the one end 43e of the motor shaft 43 to each other.

A case in which at least a part of the oil cooler 73 protrudes from the casing 10 in the radial direction RD or to the one axial-direction side AD1 does not occur in the drive apparatus 201 of Example 2 as well. It becomes possible to reduce the increase in the physical size of the drive apparatus 1 due to the oil cooler 73.

Example 3

Figure 4:
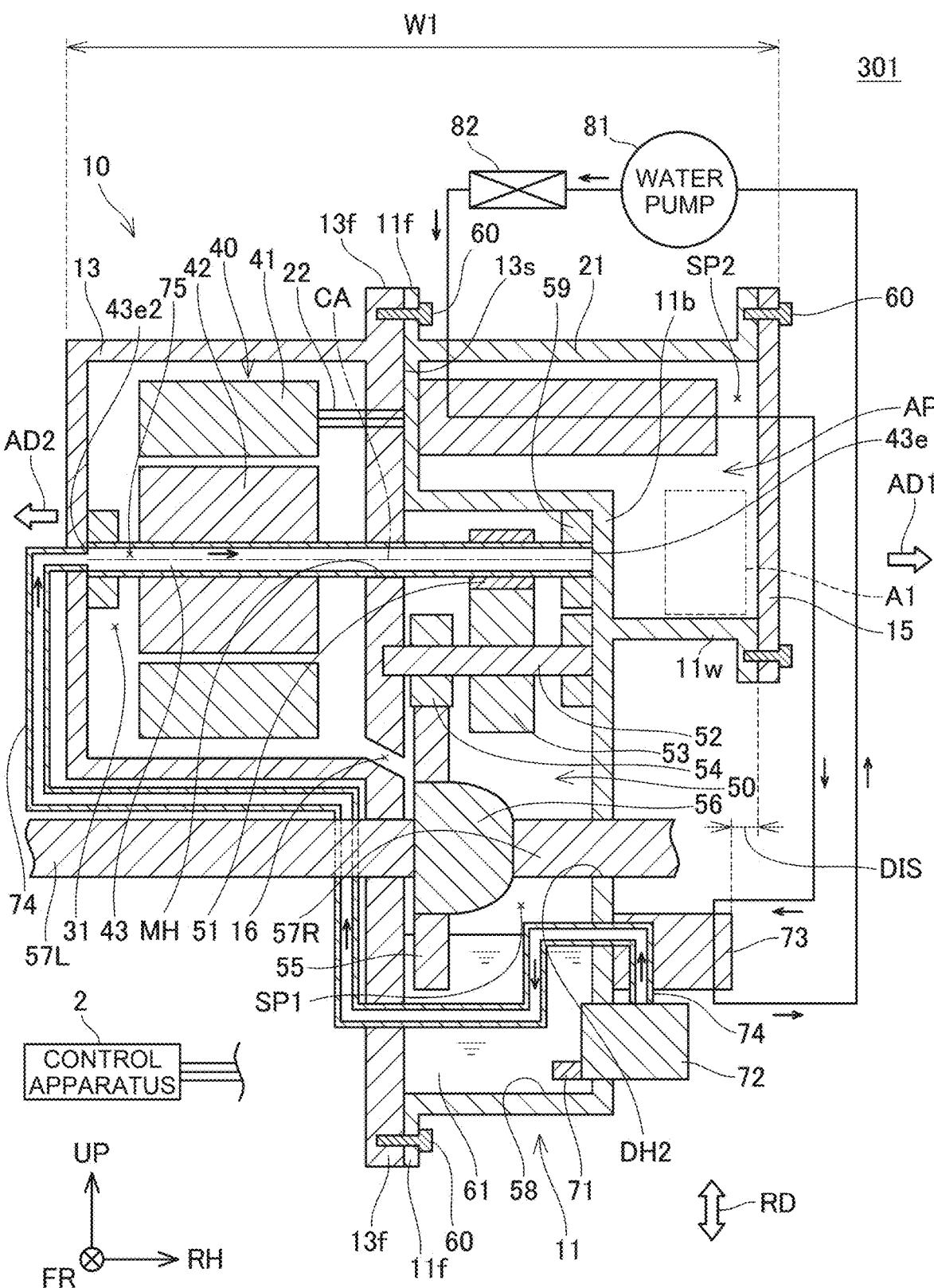
FIG. 4 is a sectional view showing a schematic configuration of the drive apparatus.

Example 3 is different from Example 1 regarding a routing aspect of the oil passage 74. Sections in common between Example 1 and Example 3 are denoted by the same reference characters and description thereof is omitted. FIG. 4 shows a schematic configuration of a drive apparatus 301 of Example 3. FIG. 4 is a sectional view similar to FIG. 1.

In the drive apparatus 301 of Example 3, the motor shaft 43 includes another end 43e2 on the other axial-direction side AD2. An inflow port to the axial-center flow passage 75 is formed in the other end 43e2. The oil pump 72 is positioned on the one axial-direction side AD1 with respect to the gear chamber SP1. In other words, both of the oil pump 72 and the oil cooler 73 are disposed on the same direction side with respect to the gear chamber SP1. The oil pump 72 and the oil cooler 73 overlap with the gear chamber SP1 in the axial direction of the central axis CA. The oil pump 72 and the oil cooler 73 overlap with the electric unit chamber SP2 in the radial direction RD. The oil passage 74 connects the discharge port of the oil pump 72 and the inflow port of the oil cooler 73 to each other and connects the discharge port of the oil cooler 73 and the other end 43e2 of the motor shaft 43 to each other. The oil flows through the axial-center flow passage 75 to the one axial-direction side AD1.

It becomes possible to reduce the increase in the physical size of the drive apparatus 301 due to the oil cooler 73 in the drive apparatus 301 of Example 3 as well.

Example 4

Figure 5:
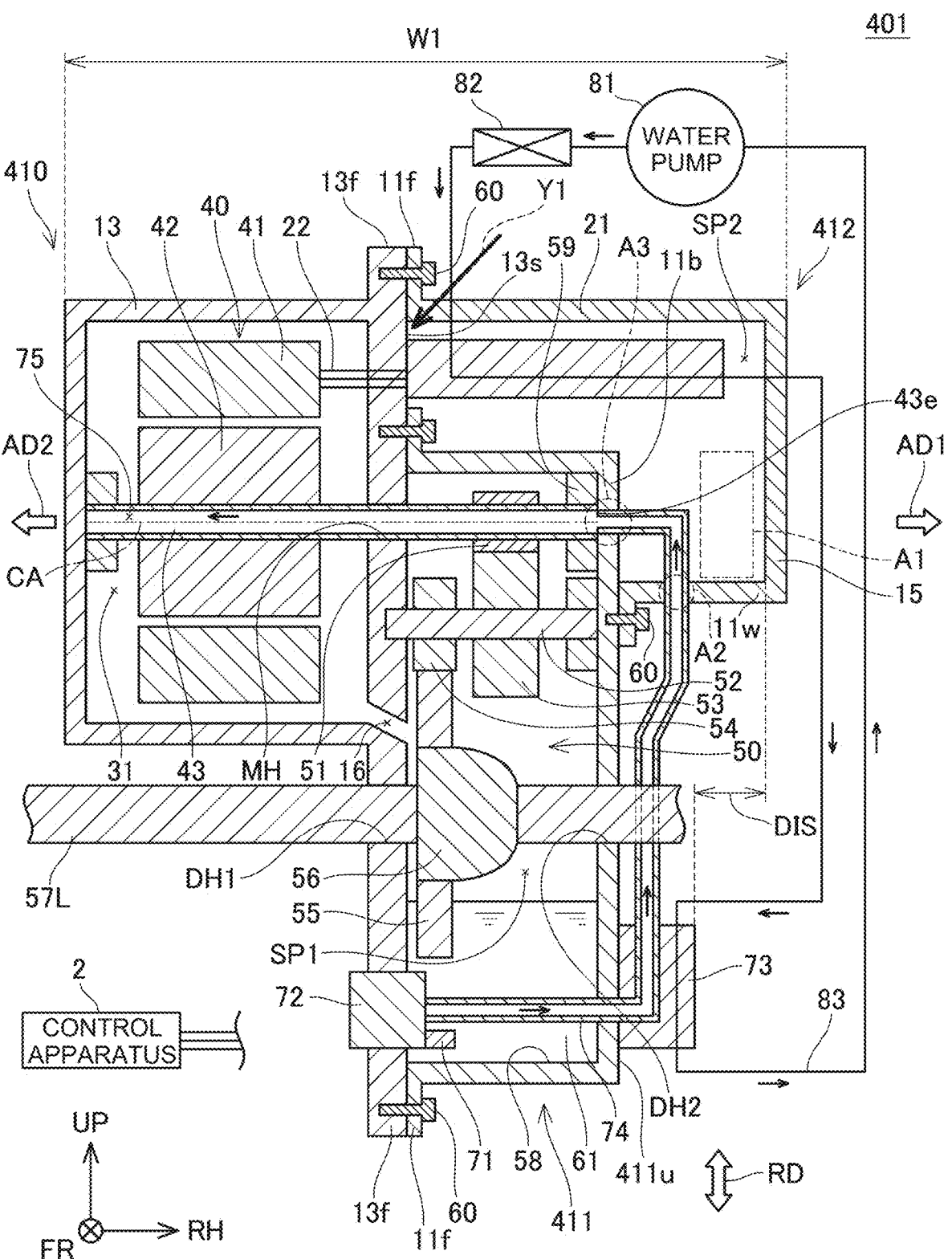
FIG. 5 is a sectional view showing a schematic configuration of the drive apparatus.

Example 4 is different from Example 1 regarding an aspect of the casing. Sections in common between Example 1 and Example 4 are denoted by the same reference characters and description thereof is omitted. FIG. 5 shows a schematic configuration of a drive apparatus 401 of Example 4. FIG. 5 is a sectional view similar to FIG. 1. In FIG. 5, elements specific to Example 4 are distinguished by being denoted by reference characters in the 400s.

A casing 410 includes a first case 411, a second case 412, and the motor case 13. The first case 411 is fastened to the facing surface 13s of the motor case 13 by the plurality of bolts 60. The gear chamber SP1 is defined between the motor case 13 and the first case 411.

The second case 412 includes a box-like shape of which one surface is open. The second case 412 is fastened to the facing surface 13s and an upper surface 411u of the first case 411 by the plurality of bolts 60. As a result, the electric unit chamber SP2 is defined between the second case 412 and each of the motor case 13 and the first case 411. Therefore, a part of the electric unit chamber SP2 can be positioned on the extension line of the motor shaft 43 toward the one axial-direction side AD1 as a result of assembling the second case 412 on the first case 411 (see the region A1).

Effects

It becomes possible to attach the electric power conversion unit 21 in a state in which only the second case 412 is removed from the motor case 13 by separately configuring the first case 411 that houses the gear unit 50 and the second case 412 that houses the electric power conversion unit 21. As a result, there are no interferences from the second case 412 when the electric power conversion unit 21 is attached. Therefore, the direction of access of a tool to a contact portion between the electric power conversion unit 21 and the facing surface 13s can be enlarged (see a dotted arrow Y1). The ease of assembly of the electric power conversion unit 21 can be enhanced.

The embodiments have been described in detail above, but those are merely exemplifications and do not limit the scope of claims. The technology described in the scope of claims includes those obtained by variously modifying and changing the specific examples exemplified above. The technical elements described in the present specification or the drawings exhibit a technical utility by itself or various combinations, and are not limited to the combinations described in the claims as originally filed. The technology exemplified in the present specification or the drawings achieves a plurality of objects at the same time, and has a technical utility as a result of achievement of one of those objects itself.

Modified Examples

The vehicle on which the drive apparatus of the present specification is mounted is not limited to the battery electric vehicle. The drive apparatus of the present specification can be mounted on a hybrid electric vehicle or a plug-in hybrid electric vehicle, for example. In this case, the drive apparatus of the present specification may store a planetary gear mechanism or store a plurality of motors in the casing. The drive apparatus of the present specification can also be applied to a vehicle that uses an electric motor in at least a part of the traveling such as a fuel cell electric vehicle, for example.

What is claimed is:

1. A drive apparatus, comprising:
   a casing including:
   a motor chamber;
   a gear chamber; and
   an electric unit chamber, the electric unit chamber having at least a part positioned to be closer to one axial-direction side than the gear chamber;
   a motor housed in the motor chamber and including a motor shaft, the motor shaft having one end on the one axial-direction side positioned in the gear chamber;
   a gear unit housed in the gear chamber and configured to be mechanically connected to the one end of the motor shaft;
   an electric unit housed in the electric unit chamber and configured to be electrically connected to the motor;
   a first route configured to supply a first heat medium configured to cool the motor to the motor;
   a second route configured to supply a second heat medium configured to cool the electric unit to the electric unit; and
   a heat exchanger configured to:
   be included on the first route and on the second route;
   exchange heat between the first heat medium and the second heat medium; and
   have at least a part that overlaps with the gear chamber in the axial direction and that overlaps with the electric unit chamber in a radial direction perpendicular to the axial direction.

2. The drive apparatus according to claim 1, wherein at least a part of the electric unit chamber is positioned to be positioned on the one axial-direction side relative to the heat exchanger.

3. The drive apparatus according to claim 2, wherein at least the part of the electric unit chamber overlaps with the gear chamber in the radial direction.

4. The drive apparatus according to claim 3, wherein at least the part of the electric unit chamber overlaps with the motor chamber in the axial direction.

5. The drive apparatus according to claim 1, wherein at least a part of the heat exchanger and at least a part of the first route are positioned on the one axial-direction side with respect to the gear chamber.

6. The drive apparatus according to claim 5, wherein at least the part of the first route is configured by a pipe member.

7. The drive apparatus according to claim 5, wherein the first route extends into the electric unit chamber from an outside of the casing by passing through a wall surface that defines the electric unit chamber of the casing.

8. The drive apparatus according to claim 7, wherein:
   a part of the electric unit chamber is positioned on an extension line of the motor shaft toward the one axial-direction side;
   the one end of the motor shaft is supported by a separating wall between the gear chamber and the electric unit chamber;
   a flow passage is provided in an axial center of the motor shaft;
   the first route is configured to extend through an inside of the electric unit chamber and pass through the separating wall; and
   the first route is configured to be connected to the flow passage at the one end.

9. The drive apparatus according to claim 8, further comprising a pump configured to send out the first heat medium accumulated in the gear chamber to the first route, wherein:
   the pump is positioned on the one axial-direction side or the other axial-direction side with respect to the gear chamber; and
   within the first route, the heat exchanger is disposed in a section that connects the pump and the one end of the motor shaft to each other.

10. The drive apparatus according to claim 1, wherein:
   the motor chamber and the gear chamber are connected to each other by a communication hole configured such that the first heat medium flows through the communication hole; and
   the electric unit chamber is isolated from the motor chamber and the gear chamber in a liquid-tight manner.

11. The drive apparatus according to claim 1, wherein:
   the casing includes:
   a motor case including the motor chamber;
   a gear case configured to define at least a part of the gear chamber; and
   an electric unit case configured to define at least a part of the electric unit chamber; and
   the gear case and the electric unit case are fastened to the motor case by a plurality of fastening members.

* * * * *